US012328477B2

(12) United States Patent
Dever et al.

(10) Patent No.: US 12,328,477 B2
(45) Date of Patent: *Jun. 10, 2025

(54) SYSTEMS AND METHODS TO PROVIDE MEDIA ASSET RECOMMENDATIONS BASED ON POSITIONING OF INTERNET CONNECTED OBJECTS ON AN NETWORK-CONNECTED SURFACE

(71) Applicant: Adeia Guides, Inc., San Jose, CA (US)

(72) Inventors: Sara Dever, Boothwyn, PA (US); Jennifer L. Holloway, Wallingford, PA (US); Daniel P. Rowan, Springfield, PA (US); Mark D. Thompson, Havertown, PA (US)

(73) Assignee: Adeia Guides Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/585,421

(22) Filed: Feb. 23, 2024

(65) Prior Publication Data

US 2024/0236425 A1    Jul. 11, 2024

Related U.S. Application Data

(63) Continuation of application No. 18/127,796, filed on Mar. 29, 2023, now Pat. No. 11,943,509, which is a
(Continued)

(51) Int. Cl.
*H04N 21/466* (2011.01)
*H04N 21/422* (2011.01)
*H04N 21/45* (2011.01)

(52) U.S. Cl.
CPC ....... *H04N 21/4668* (2013.01); *H04N 21/422* (2013.01); *H04N 21/4532* (2013.01)

(58) Field of Classification Search
CPC ............ H04N 21/4668; H04N 21/422; H04N 21/4532; G06Q 30/0261; G06Q 30/00
See application file for complete search history.

(56) References Cited

U.S. PATENT DOCUMENTS

| 6,239,794 B1 | 5/2001 | Yuen et al. |
| 6,564,378 B1 | 5/2003 | Satterfield et al. |
| (Continued) | | |

FOREIGN PATENT DOCUMENTS

| WO | 2015102974 A1 | 7/2015 |
| WO | 2016200588 A1 | 12/2016 |

OTHER PUBLICATIONS

PCT International Search Report for International Application No. PCT/US2018/024951, dated Jun. 6, 2019 (14 pages).

*Primary Examiner* — Timothy R Newlin
(74) *Attorney, Agent, or Firm* — Haley Guiliano LLP

(57) ABSTRACT

System and methods are described to determining a recommendation for a user based on changes in objects detected on a network-connected surface. The system receives, from the network-connected surface, a plurality of object identifiers for a plurality of physically inanimate objects of different types detected on the network-connected surface, wherein the object identifiers indicate a positioning of each object; determines, based on the object identifiers, a first arrangement of the plurality of physically inanimate objects; detects one or more changes in the plurality of object identifiers, wherein the one or more changes correspond to one or more changes in positioning from the first arrangement; in response to detecting the one or more changes, determines a second arrangement of the plurality of physically inanimate objects; and generates a content recommendation based on the second arrangement.

20 Claims, 9 Drawing Sheets

Related U.S. Application Data continuation of application No. 17/366,898, filed on Jul. 2, 2021, now Pat. No. 11,647,255, which is a continuation of application No. 17/041,005, filed as application No. PCT/US2018/024951 on Mar. 28, 2018, now Pat. No. 11,089,372.

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,069,081 B2* | 11/2011 | Neufeld ............... H04N 21/252 |
| | | 345/175 |
| 8,502,816 B2* | 8/2013 | Butler ................... G06F 3/0488 |
| | | 362/558 |
| 9,712,482 B2 | 7/2017 | Aravamudan |
| 9,723,248 B1* | 8/2017 | Colburn ............... H04N 9/3194 |
| 11,089,372 B2 | 8/2021 | Dever et al. |
| 11,647,255 B2 | 5/2023 | Dever et al. |
| 11,943,509 B2 | 3/2024 | Dever et al. |
| 2002/0174430 A1 | 11/2002 | Ellis et al. |
| 2005/0185825 A1* | 8/2005 | Hoshino ............... G06F 3/0425 |
| | | 382/199 |
| 2005/0251827 A1 | 11/2005 | Ellis et al. |
| 2010/0074464 A1* | 3/2010 | Neufeld ............... H04N 21/472 |
| | | 345/156 |
| 2010/0153885 A1 | 6/2010 | Yates |
| 2011/0292299 A1* | 12/2011 | Lau ....................... G06F 3/0488 |
| | | 725/39 |
| 2012/0280941 A1* | 11/2012 | Hu ........................ G06F 3/0425 |
| | | 345/175 |
| 2013/0088465 A1 | 4/2013 | Geller et al. |
| 2013/0286199 A1* | 10/2013 | Di Censo ............ H04N 1/00129 |
| | | 348/143 |
| 2014/0040945 A1* | 2/2014 | Gates, III .......... H04N 21/44213 |
| | | 725/34 |
| 2015/0242044 A1* | 8/2015 | Nam ..................... G06F 3/0393 |
| | | 345/173 |
| 2016/0368364 A1* | 12/2016 | Aoki ...................... B60K 11/08 |
| 2017/0031530 A1* | 2/2017 | Ikeda ....................... H04N 5/74 |
| 2017/0280196 A1 | 9/2017 | Thomas et al. |
| 2020/0319835 A1* | 10/2020 | Bae ....................... G06F 3/1423 |
| 2021/0120309 A1 | 4/2021 | Dever et al. |
| 2021/0337275 A1 | 10/2021 | Dever et al. |
| 2023/0247256 A1 | 8/2023 | Dever et al. |

* cited by examiner

600

602 — Receive, from the Network-connected Surface, a Plurality of Object Identifiers for a Plurality of Physically Inanimate Objects of Different Types Detected on the Network-connected Surface, Wherein the Object Identifiers Indicate a Positioning of Each Object

604 — Determine, Based on the Object Identifiers, a First Arrangement of the Plurality of Physically Inanimate Objects

606 — Detect One or More Changes in the Plurality of Object Identifiers, Wherein the One or More Changes Correspond to One or More Changes in Positioning from the First Arrangement

608 — Determine a Second Arrangement of the Plurality of Physically Inanimate Objects

610 — Generate a Content Recommendation Based on the Second Arrangement

FIG. 6

SYSTEMS AND METHODS TO PROVIDE MEDIA ASSET RECOMMENDATIONS BASED ON POSITIONING OF INTERNET CONNECTED OBJECTS ON AN NETWORK-CONNECTED SURFACE

CROSS-REFERENCE TO RELATED APPLICATIONS

This application is a continuation of U.S. patent application Ser. No. 18/127,796, filed Mar. 29, 2023, which is a continuation of U.S. patent application Ser. No. 17/366,898, filed Jul. 2, 2021, now U.S. Pat. No. 11,647,255, which is a continuation of U.S. patent application Ser. No. 17/041,005, filed Sep. 24, 2020, now U.S. Pat. No. 11,089,372, which is a national stage application under 35 U.S.C. § 371 of International Application PCT/US2018/024951, filed Mar. 28, 2018, the disclosures of which are hereby incorporated by reference herein in their entireties.

BACKGROUND

Related art systems recommend content in accordance with user preferences recorded in a user profile associated with the user. Related art systems are unable to recommend content based on detecting an environment created by objects placed within the vicinity of a display device. Related art systems are unable to determine an environment created by a user just by, e.g., simply moving around furniture that is placed on a surface. For example, related art systems are unable to determine the number and orientation of a plurality of chairs in a room. Because related art systems are not able to infer an environment created by a user from a layout of furniture provided by the user, related art systems are not able to recommend environment-specific content. Such systems have to wait for explicit instructions from the user to recommend content.

SUMMARY

Accordingly, systems and methods are provided herein to recommend content based on a detected positioning of objects that are connected over the Internet. For example, a specific arrangement of furniture in a room over a network-connected surface may indicate that a user wishes to watch television. In some examples, this specific arrangement may include changing the orientation of furniture in a room to face a display device (e.g., the television). This arrangement may indicate that the user is interested in watching a media asset on the display device present in the room and may recommend content to the user. In some examples, the number and the type of chairs present in the room may provide more information to a media guidance application regarding the kind of content that may be recommended to the user.

In order for the media guidance application to determine an orientation of objects placed in a particular area, the objects are connected to each other over the Internet and placed on a network-connected surface that communicates with the media guidance application. In some examples, a network-connected surface may be a surface with a capability to communicate with other devices over a network like the Internet, for example. The media guidance application connected to the network-connected surface is able to keep track of attributes like location, orientation, type, and number of objects placed on the surface and provides this information to the media guidance application, which then uses this information to provide content recommendations to the user in the vicinity of these objects.

In some aspects, the media guidance application may determine a recommendation for a user based on changes in positioning of objects detected on a network-connected surface. The media guidance application may receive, from the network-connected surface, a plurality of object identifiers for a plurality of physically inanimate objects of different types detected on the network-connected surface. In some examples, the network-connected surface may cover part of a floor or the entire floor of a room within a house. In such examples, the objects placed on the surface may include furniture pieces like tables, lamps, chairs, couches, etc. In such examples, the media guidance application may detect a variety of objects placed on the network-connected surface. Each object may be independently capable of connecting to the network (e.g., Internet) and may have a digital identifier associated with it that identifies the object to other objects. In some examples, the various objects may be connected to the media guidance application via the network (e.g., Internet) or just connected to the media guidance application surface by virtue of being placed on the network-connected surface. From the connection, the media guidance application may receive the identifiers of each object placed on the network-connected surface. The network-connected surface may be connected to the media guidance application over a network, like the Internet, for example. In some examples, the network-connected surface may be connected to the media guidance application using a wired connection. Each identifier received at the media guidance application may include a type of the object that may indicate whether the object is a chair, or a table, or a lamp, etc. Using the received identifiers, the media guidance application may determine an orientation and location of the object on the network-connected surface. Using these identifiers of each object placed on the surface, the media guidance application may keep track of the objects present on the network-connected surface.

The media guidance application determines a first positioning of each object of the plurality of inanimate objects from the plurality of object identifiers. For example, in response to detecting a connection between the network-connected surface and each object placed on the network-connected surface having been established, and in response to determining that the media guidance application has access to each object identifier, the media guidance application may be able to associate a location with each identified object identifier placed on the network-connected surface. The location may be stored with respect to the dimensions of the network-connected surface. The media guidance application may save a placement and orientation of each object placed on the network-connected surface.

The media guidance application keeps a record of the location of the objects placed on the network-connected surface. Using the saved locations, the media guidance application may determine if there is a change in the position of any of the objects placed on the surface. The media guidance application detects one or more changes in the plurality of object identifiers, where the one or more changes correspond to one or more changes in positioning from the first positioning. For example, the furniture placed on the network-connected surface may be moved around by the user. In some examples, the user may move a chair to sit on it and have dinner. In some examples, the user may move around a lot of furniture in the room to setup for a Super Bowl viewing party. Using the identifiers associated with each object placed on the surface, the media guidance application may update the location of each object as it is moved around over the network-connected surface. The media guidance application may compare the updated locations of the physically inanimate objects placed on the network-connected surface to the previously stored locations by the media guidance application to determine whether there was a change in the location of any of the objects placed on the network-connected surface.

The media guidance application may determine a new pattern of the arrangement from the updated locations of the objects placed on the network-connected surface. Based on detecting the one or more changes, the media guidance application determines a second positioning of each object of the plurality of physically inanimate objects from the plurality of object identifiers. For example, the media guidance application may determine the updated positions of the furniture placed on the network-connected surface. The media guidance application may keep track of each piece of furniture and note the position of which of the pieces of furniture were changed.

The arrangement of the furniture may be compared to a database that includes various templates of furniture arrangement. The media guidance application compares attributes of the second positioning of the plurality of physically inanimate objects to attributes of each template of a plurality of templates, where each template corresponds to a different possible positioning of the plurality of physically inanimate objects. For example, once the media guidance application has recorded the positioning of each piece of furniture placed on the network-connected surface, the media guidance application compares the layout of the furniture in the room to each entry in a database comprising a plurality of furniture layouts. Each furniture layout template may correspond to a particular scenario. The arrangement of the furniture on the network-connected surface may be compared with the templates to determine which template is closest to the furniture arrangement on the network-connected surface.

Based on the comparison, the media guidance application may infer an environment being created by the user. The media guidance application determines, from the comparing, a first template from the plurality of templates to which the second positioning of the plurality of physically inanimate objects corresponds. For example, from the comparison between the layout of the furniture on the network-connected surface to the various templates, the media guidance application may determine that furniture layout resembles a layout for a Super Bowl party. In some examples, the furniture layout may represent a layout for a birthday party. In some examples, the furniture may be moved in such a way as to make room for more or different kinds of furniture.

The media guidance application may use the determined template layout of furniture to determine media attributes associated with the layout. The media guidance application determines a set of media attributes corresponding to the first template by comparing the first template to entries of a database that each correspond a respective template of the plurality of templates to a respective set of media attributes. For example, if the detected furniture layout resembles a Super Bowl party, the media guidance application may determine that the media attributes associated with the layout may be 'sports', 'NFL', 'football', and 'lombardi trophy.' In the example in which the furniture layout resembles a birthday party, there may be no media attributes, to indicate that the user is not interested in any television program, or the attributes associated may be 'birthday', 'celebration', and 'party.'

Based on the determined media attributes, the media guidance application generates a content recommendation based on the first set of media attributes. For example, in the case the media attributes are 'sports', 'NFL', 'football', and 'lombardi trophy', the media guidance application may recommend the Super Bowl pregame show, the Super Bowl, the half-time show etc. In the case that the media attributes are birthday', 'celebration', and 'party', the media guidance application may recommend party music playlists and media assets related to birthday like '13 going on 30', 'Harry Potter', or 'Toy Story', for example. In case that there are no media attributes associated with a template, the media guidance application may not recommend any media assets.

In some embodiments, the media guidance application detects whether a display device is present in a vicinity of the network-connected surface. For example, the media guidance application that is connected to the network-connected surface determines whether a display device is present in the same room as the network-connected surface. In some examples, the media guidance application may be connected to the network-connected surface and the display device over the network, like the Internet, for example. In response to detecting that the display device is present in the vicinity of the network-connected surface, the media guidance application transmits a command to the display device to display the content recommendation on the display device. So, in some examples, if the media guidance application determines the presence of a display device in the same room as the network-connected surface, the media guidance application may display the content recommendation of the Super Bowl to the user.

In some embodiments, the media guidance application determines a type of each physically inanimate object of the plurality of physically inanimate objects placed on the network-connected surface. For example, the media guidance application determines each type of furniture placed on the network-connected surface. In such examples, the types of furniture may include chair, sofa, recliner, coffee table, end table, dining table, etc.

Based on the different types of furniture determined, the media guidance application groups the plurality of physically inanimate objects into different groups. For example, the media guidance application may group all chairs of a first type (e.g., dining chairs) in one group. In such examples, the end tables may be grouped together, and the different couches may be grouped together. Furthermore, the recliners may be part of a different group. In some examples, the groups may be determined using the information stored in the identifier of each object accessible by the media guidance application.

The media guidance application may determine a change in orientation of a given object of the physically inanimate objects. For example, the media guidance application, along with determining that a location of an object on the network-connected surface has been changed, may also determine whether the orientation of an object has been changed. In some examples, this includes determining whether the furniture is now facing something different. For example, in terms of a chair or a sofa, the media guidance application may determine whether the chair or sofa is now facing a particular direction.

The media guidance application determines, from the type of the given object, whether the change in orientation will affect a direction a person would face when using the given object. For example, if the orientation of a coffee table is changed, that does not affect the direction a person would face, because the coffee table is not something a person may sit on. Similarly, the orientation of the chair, if modified, would change the direction a user would likely face when the user sat on it. In response to determining that the change in orientation will not affect a direction a person would face when using the given object, the media guidance application ignores the change in orientation. For example, a change in orientation of the coffee table, end table, lamp, or any other object that the user may not sit on, will be ignored by the media guidance application.

In some embodiments, in response to determining that the change in orientation will affect a direction a person would face when using the given object, the media guidance application determines that given object faces a display device, where the given object did not face the display device before the detected change in orientation was detected. For example, the media guidance application may determine that a change in orientation of a chair in a room may affect the direction in which the user sitting on the chair will face. In this example, when the orientation of the chair is changed, the direction the user faces while sitting on the chair is modified. In this example, upon determining that the orientation of the chair has changed, the media guidance application determines whether the new orientation of the chair faces the display device in the vicinity of the network-connected device. The media guidance application may also determine whether the previous orientation of the chair did not face the display device. The media guidance application, while keeping track of the position of each object placed on the network-connected surface, also keeps track of the orientation of every such object.

In response to determining that the given object now faces the display device, the media guidance application generates for display the content recommendation on the display device. For example, the media guidance application may infer, from the change in orientation of the chair to face the display device, that now that the chair is facing the display device, the user is getting ready to watch a media asset on the display device, and instructs the display device to display the recommended content.

In some embodiments, further in response to determining that the given object faces a display device, where the given object did not face the display device before the detected change in orientation was detected, the media guidance application determines whether the given object faced a different display device prior to the detected change in orientation. For example, there may be more than one display device in the vicinity of the network-connected surface. In this example, a room may have two televisions on two different walls, or may have a monitor connected to a computer and a television. The media guidance application may detect that the change in orientation of a chair which was initially facing a first display device (e.g., the monitor), is now facing the second display device (e.g, i.e., the television). While the chair was facing the first display device, the media guidance application was displaying the recommendation of the content on the first display device.

In response to determining that the given object faced the different display device prior to the detected change in orientation, the media guidance application commands the different display device to cease generating for display the recommendation. For example, now that the media guidance application has determined that the orientation of the chair has turned away from the first display device to face a second display device, the media guidance application instructs the first display device to stop displaying the recommended for the content.

In some embodiments, the media guidance application detects a placement of an additional physically inanimate object on the network-connected surface. In some examples, the additional physically inanimate object may be another object of one of the types of objects already present on the network-connected surface. For example, the new object may be another chair of the same type that is already present in the living room. In some examples, the new object placed on the network-connected surface may be of a different kind than the objects already present on the surface. For example, the user may bring in a high chair for their child from a different part of the house and place it on the network-connected surface.

The media guidance application compares attributes of the third positioning of the plurality of physically inanimate objects to attributes of each template of a plurality of templates, where each template corresponds to a different possible positioning of the new physically inanimate object. For example, the location of the new object placed on the network-connected surface is added to the layout of the objects present on the network-connected surface. The placement of this new object may modify layout of the furniture placed on the network-connected surface. In such an example, the media guidance application now compares this modified template to the plurality of templates present in the database to determine, from the comparing, a second template from the plurality of templates to which the third positioning of the new physically inanimate objects corresponds. In this example, the media guidance application may detect a high chair of a child placed on the network-connected surface. The positioning of the high chair may modify the furniture template on the network-connected surface. Based on the positioning of this new object on the network-connected surface, the media guidance application may compare the updated furniture layout to the plurality of templates of furniture layouts.

The media guidance application may also keep track of the number of objects placed on the network-connected surface. In some embodiments, the media guidance application determines a first number of physically inanimate objects placed on the network-connected surface. For example, the media guidance application may determine a count of the number of objects placed on the network-connected surface. The media guidance application may further divide the count of the number of objects placed on the surface based on type of object. For example, the media guidance application may determine that there are 10 different objects placed on the network-connected surface. The media guidance application, based on a type associated with each physically inanimate object, may determine a second number of physically inanimate objects that may be used for sitting. For example, of the 10 objects placed on the network-connected surface, the media guidance application may determine that there is one dining table, 6 chairs, two sofas and a coffee table.

The media guidance application may determine from the number of objects of various types, a scenario that the user is creating on the network-connected surface and, based on the number of objects, may update the content recommendation. The media guidance application compares the second number of physically inanimate objects to a threshold, and based on the comparison, updates the first content recommendation to an updated content recommendation. For example, the media guidance application may determine that there are 16 chairs instead of 6 chairs placed on the network-connected surface. Based on the increase in the number of chairs above a particular threshold of 8 chairs, the media guidance application may determine that the user has scheduled a viewing party and may recommend content appropriate for viewing parties, like the Super Bowl, the Oscars, 'Game of Thrones', etc.

In some embodiments, the media guidance application determines an additional set of media attributes associated with the second template by comparing the second template to entries of a database that each correlates a respective template of the plurality of templates to a respective set of media attributes. For example, the media guidance application may use the updated template to determine an additional set of media attributes that are associated with the updated template. In this example, the media guidance application may determine that the number of chairs placed on the network-connected surface has increased from 6 to 16. Based on the increase in the number of chairs placed on the network-connected surface, the media guidance application updates the template layout of furniture that the layout of the furniture on the network-connected surface corresponds to. This updated template may be associated with a different set of media attributes in the database. For example, because the number of chairs placed on the network-connected surface has increased to indicate a viewing party, the media attributes associated with any furniture layout may include attributes, like 'NFL', 'football', 'Oscars', etc. Before the media guidance application detected the presence of the high chair, the media guidance application may have determined that the media attributes of the previous template may be 'action', 'thriller', or 'romance'.

The media guidance application determines whether there is a conflict between the set of media attributes and the additional set of media attributes, and in response to determining that there is no conflict between the set of media attributes and the additional set of media attributes, the media guidance application updates the set of media attributes corresponding to the first template to include the additional set of media attributes corresponding to the second template, and updates the content recommendation to an updated content recommendation based on the updated media attributes. For example, the media guidance application may determine that the additional media attributes like 'NFL', 'football', 'Oscars', etc., do not conflict with the previous media attributes of 'action' and 'thriller' and, therefore, the media guidance application may update the set of media attributes to include the additional media attributes of 'thriller' and 'action.' Based on this update, the media guidance application may recommend the Super Bowl to the user instead of the previous recommendation of a movie.

In some embodiments, the media attributes of the updated layout may not conflict with the media attributes of the previous layout. In some embodiments, in response to determining that there is a conflict between the set of media attributes and the additional set of media attributes, the media guidance application refrains from updating the content recommendation to the updated content recommendation. For example, the media guidance application may determine that the attributes indicated by the updated layout conflict with the attributes of the previous layout, namely, the attribute of 'NFL' conflicts with the attribute of 'romance', and based on the fact the media attributes conflict, the media guidance application may not update the content recommendation and may just ignore the update to the furniture layout.

In some embodiments, further in response to determining a conflict between the set of media attributes and the additional set of media attributes, the media guidance application generates a second content recommendation based on the additional set of media attributes on a secondary display device, for example, when the media guidance application determines that there is present in the room with the network-connected device a secondary device. Based on this determination, the media guidance application may generate the second content recommendation of the Super Bowl on the secondary device.

BRIEF DESCRIPTION OF DRAWINGS

The above and other objects and advantages of the disclosure will be apparent upon consideration of the following detailed description, taken in conjunction with the accompanying drawings, in which like reference characters refer to like parts throughout, and in which:

FIG. 6 depicts an illustrative flowchart of a process for providing media asset recommendations based on orientation of Internet-connected objects, in accordance with some embodiments of the disclosure;

DETAILED DESCRIPTION

Systems and methods are provided herein to recommend content based on a detected orientation of objects that are connected over the Internet. For example, a specific arrangement of furniture in a room over a network-connected surface may indicate that a user wishes to watch television. In some examples, this specific arrangement may include changing the orientation of the chairs in a room to face a display device (e.g., the television). This arrangement may indicate that the user is interested in watching a media asset on the display device present in the room and may recommend content to the user. In some examples, the number and the type of chairs present in the room may provide more information to a media guidance application regarding the kind of content that may be recommended to the user.

In order for the media guidance application to determine an orientation of objects placed in a particular area, the objects are connected to each other over the Internet and placed on a network-connected surface that communicates with the media guidance application. In some examples, a network-connected surface may be a surface with a capability to communicate with other devices over a network like the Internet, for example. The media guidance application is able to keep track of attributes like location, orientation, type, and number of objects placed on the network-connected surface using the information from the network-connected surface. The media guidance application uses this information to provide content recommendations to the user in the vicinity of these objects.

Figure 1:
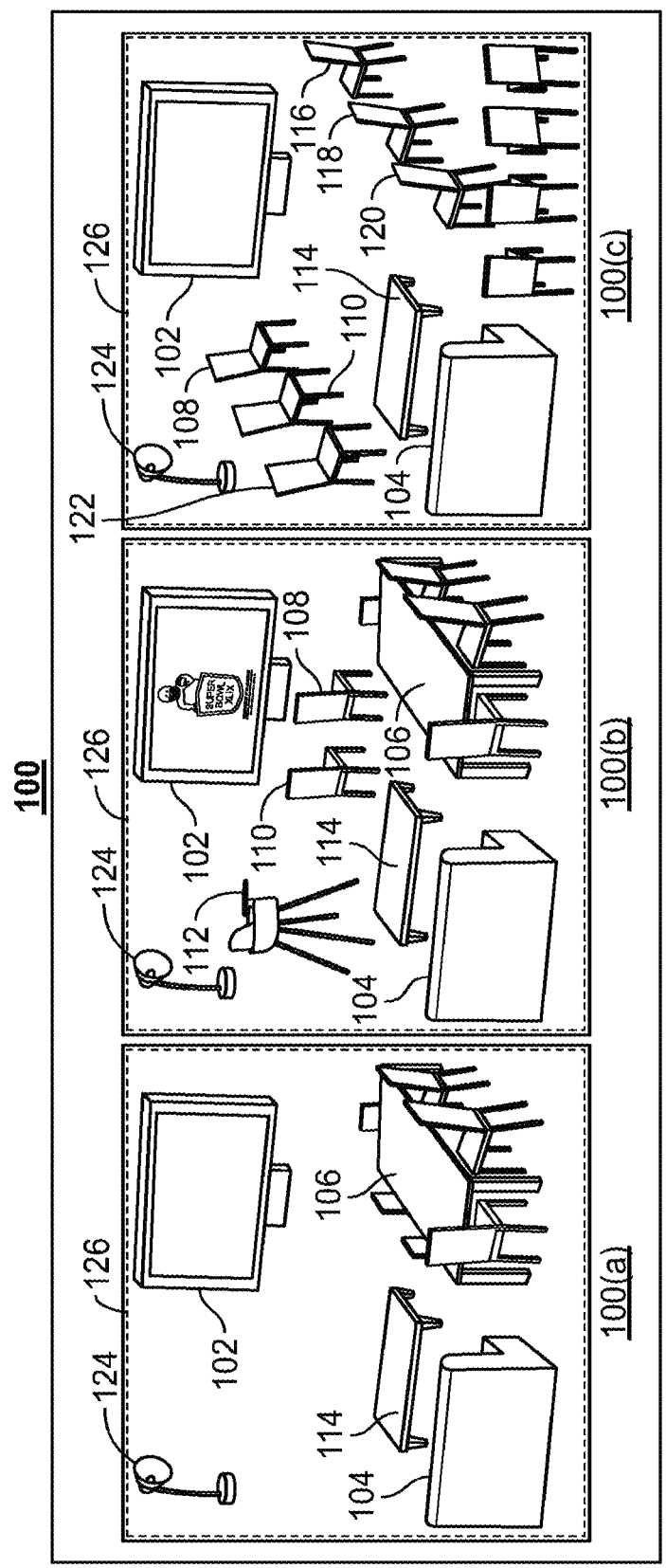
FIG. 1 shows an illustrative example of providing media asset recommendations based on orientation of Internet-connected objects, in accordance with some embodiments of the disclosure.

FIG. 1 shows an illustrative example of providing media asset recommendations based on orientation of Internet-connected objects, in accordance with some embodiments of the disclosure. FIG. 1 shows exemplary views 100(*a*), 100(*b*), and 100(*c*) of the same living room. Layouts 100(*a*), 100(*b*), and 100(*c*) each depict a different layout of furniture in the room that helps the media guidance application. Layout 100(*a*) depicts a display device 102, a couch 104, a coffee table 114, a dining table 106 with chairs 108 and 110, and a lamp 124, placed on a network-connected surface 126. Network-connected surface 126 may be a carpet-like surface that covers a part or complete floor of a room. Network-connected surface 126 may be able to detect objects placed on network-connected surface 126. Network-connected surface 126 may be an electronic surface connected to the media guidance application over the Internet and may contain all the information for the media guidance application for interpretation. This may represent a baseline positioning of furniture in a room. The objects depicted in FIG. 1 present on the network-connected surface 126 are merely illustrative, and any object on network-connected surface 126 may replace any of the specific examples, like the coffee table, etc.

The media guidance application may receive from network-connected surface 126 a plurality of object identifiers for a plurality of objects of different types detected on network-connected surface 128. As depicted in FIG. 1, network-connected surface 126 may cover part of a floor or the entire floor of a room within a house. The objects (102-114) placed on network-connected surface 126 may include furniture pieces like tables (106, 104), lamp (124), chairs (108 and 110), couch (104), etc. In such examples, the media guidance application may detect a variety of objects placed on network-connected surface 126. Each object may be independently capable of connecting to the network (e.g., Internet) and may have a digital identifier associated with it that identifies the object to other objects. In some examples, the various objects may have wireless Internet or Bluetooth capability that will allow them to be connected to the Internet, or to the network-connected surface 126 directly. In some embodiments, the objects may connect to network-connected surface 126 by virtue of being placed on the network-connected surface. In some embodiments, a mobile application associated with network-connected surface 126 may form a network of which all the objects placed on network-connected surface 126 are a part. The application may be used to connect the network-connected surface 126 so that the media guidance application may access the identifiers of each object. The application may also be used to provide a user access to the digital identifiers of each piece of furniture placed on network-connected surface 126.

From the connection, the media guidance application may receive the identifiers of each object placed on the network-connected surface 126. In some embodiments, the network-connected surface may also have Bluetooth or wireless capabilities that may allow network-connected surface 126 to be connected to the media guidance application directly, or via the Internet. In some examples, network-connected surface 126 may be connected to the media guidance application using a wired connection. Each identifier received at the media guidance application may include a type of the object that may indicate whether the object is a chair, a table, or a lamp, etc. The identifiers may also indicate an orientation and location of the object on network-connected surface 126. Using these identifiers of each object placed on the surface, the media guidance application may keep track of the objects present on the network-connected surface.

Layout 100(*a*) of FIG. 1 depicts a first positioning of each piece of furniture in the room. The media guidance application determines a first positioning of each object of the plurality of inanimate objects from the plurality of object identifiers. For example, once a connection between network-connected surface 126 and the media guidance application is established, the media guidance application may access each object identifier. The media guidance application may be able to associate a location with each identified object identifier. The location may be stored with respect to the dimensions of network-connected surface 126. The media guidance application may save a placement and orientation of each object placed on the network-connected surface.

In FIG. 1, in some embodiments, the position of each piece of furniture in FIG. 1 may be determined using a coordinate system with the origin placed at either corner of the room. In such examples, the position of the object may be the coordinates of the center of the object based on the coordinate system established. In such embodiments, the origin of the coordinate system may be placed at the bottom right, and the coordinates of the center of the couch may be determined as (5,1) which may be interpreted as the location of couch 104. The position of each piece of furniture may be similarly calculated. In some embodiments, there may be other methods of location determination based on which a position of each piece of furniture placed on network-connected surface 126 may be determined.

The media guidance application keeps a record of the location of the objects placed on network-connected surface 126 to determine if there is a change in the position of any of the objects. The media guidance application detects one or more changes in the plurality of object identifiers, where the one or more changes correspond to one or more changes in positioning from the first positioning. Layout 100(*b*) and 100(*c*) of FIG. 1 shows an exemplary embodiment of a different layout of furniture in a room over network-connected surface 126 for the same room depicted in layout 100(*a*). In layout 100(*b*), the user may move a chair 128 to sit on it and have dinner. Layout 100(*b*) also shows chairs 108 and 110 moved away from dining table 106 to face the display device 102. Layout 100(*c*) of FIG. 1 shows another exemplary embodiment of some furniture being moved around in the room over network-connected surface 126. In layout 100(*c*), the user may move around a lot of furniture in the room to set up for a party. Using the identifiers associated with each object placed on the surface, the media guidance application may update the location of each object as it is moved around over network-connected surface 126.

The updated locations of the physically inanimate objects placed on network-connected surface 126 may be compared to the previously stored locations by the media guidance application to determine whether there was a change in the location of any of the objects placed on network-connected surface 126.

The media guidance application may determine a new pattern of the arrangement from the updated locations of the objects placed on network-connected surface 126. Based on detecting the one or more changes, the media guidance application determines a second positioning of each object of the plurality of physically inanimate objects from the plurality of object identifiers. For example, the media guidance application may determine the updated positions of the furniture placed on the network-connected surface. The media guidance application may keep track of each piece of furniture and note the position of whichever of the pieces of furniture were moved.

In some embodiments, the media guidance application determines a type of each physically inanimate object of the plurality of physically inanimate objects placed on the network-connected surface. The media guidance application determines each type of furniture placed on the network-connected surface. As shown in FIG. 1, the different types of furniture shown in layouts 100(*a*), 100(*b*), and 100(*c*) include a couch 104, a coffee table 114, a dining table 106 with chairs 108 and 110, a lamp 124, high chair 112 placed on a network-connected surface 126. The different types of furniture shown in FIG. 1 are for illustrative purposes only. In some embodiments, many more different kinds of furniture may be placed on network-connected surface 126.

Based on the different types of furniture determined, the media guidance application groups the plurality of physically inanimate objects into different groups. In some embodiments, the media guidance application may be configured to group objects placed on network-connected surface 126 by particular criteria. In some embodiments, the user may ask the groupings to be performed based on functionality. For example, the media guidance application may group all objects users may sit on like chairs (108, 110, 118, 116, 120) of a first type (i.e., dining chair) and couch 104 in one group. Additionally, the coffee table 114 may be grouped together with dining table 106. In some embodiments, the user may ask the furniture to be grouped separately by type of object, in which case couch 104 may be grouped separately from the chairs and the coffee table 114 may be grouped separately from dining table 106. Other objects like lamp 124 and high chair 112 may be grouped individually. In some embodiments, the user may be able to select which pieces of furniture the user would like to be grouped together in a mobile application associated with the media guidance application.

The media guidance application also keeps track of an orientation of a given object of the physically inanimate objects in addition to the location of the object. For example, the media guidance application, along with determining that a location of an object on the network-connected surface has been changed, may also determine whether the orientation of an object has been changed. In some embodiments, detecting an orientation of an object placed in a region is further disclosed in Geller et al., U.S. Pat. No. 9,864,440, granted on Jan. 9, 2018, the disclosure of which is hereby incorporated herein in its entirety. Geller describes using a plurality of transmitters attached on different parts of an object and determining a distance of each transmitter from a particular sensor to map the object and determine an orientation of the object. A sensor similar to the one in Geller may be installed along with network-connected surface 126 that may be used to detect transmitter signals from a variety of transmitters installed on each object placed on network-connected surface 126. In some embodiments, different sensors may be used to differentiate between the front and back of objects, such that they may be facing in a particular direction when being used by a user. The media guidance application may use the information from the transmitters and receivers to determine what the furniture is facing. For example, in terms of a chair or a sofa, the media guidance application may determine whether the chair or sofa is now facing a particular direction. The direction may be marked in terms of degrees from a baseline on network-connected surface 126.

The media guidance application determines from the type of the given object, whether the change in orientation will affect a direction a person would face when using the given object. For example, if the orientation of coffee table 114 is changed, that does not affect direction a person would face, because the coffee table is not something a person may sit on. Similarly, the orientation of any of chairs 108 or 110, if modified, would change the direction a user would likely face when the user would sit on it. In response to determining that the change in orientation will not affect a direction a person would face when using the given object, the media guidance application ignores the change in orientation. For example, a change in orientation of the coffee table, end table, lamp, or any other object that the user may not sit on, will be ignored by the media guidance application.

In some embodiments, in response to determining that the change in orientation will affect a direction a person would face when using the given object, the media guidance application determines that given object faces a display device, where the given object did not face the display device before the detected change in orientation was detected. For example, the media guidance application may determine that a change in orientation of chair 108 in a room may affect the direction in which the user sitting on the chair will face. In this example, when the orientation of chair 108 is changed (from layout 100(*a*) to layout 100(*b*) of FIG. 1), the direction the user faces while sitting on the chair is modified. In this example, upon determining that the orientation of the chair has changed, the media guidance application determines whether the new orientation of the chair faces the display device 102 in the vicinity of network-connected surface 126. The media guidance application may also determine whether the previous orientation of chair 108 did not face display device 102. In some embodiments, the media guidance application may determine that chair 108 faces the display device 102 by determining whether the front of chair 108 is oriented towards the front of display device 102. In some embodiments, it may not be necessary that the front of chair 108 be parallel to the front of display device 102. The front face of chair 102 may be placed at an angle within a threshold angle of the front face of display device 102. For example, chair 108 may be placed at an angle of 45 degrees with respect to the front face of display device 102. In such embodiments, the threshold angle permissible may be 50 degrees. In cases where the angle between the front face of chair 108 and front face of display device 102 is more than 50 degrees, the media guidance application may determine that chair 108 is not facing display device 102.

In response to determining that the given object now faces the display device, the media guidance application generates for display the content recommendation on the display device. For example, the media guidance application may infer from the change in orientation of the chair to face the display device, that now that the chair is facing the display device, the user is getting ready to watch a media asset on the display device, and instructs the display device to display the recommended content.

In some embodiments, further in response to determining that given object faces a display device, where the given object did not face the display device before the detected change in orientation was detected, the media guidance application determines whether the given object faced a different display device prior to the detected change in orientation. For example, there may be a second display device (not shown) in addition to display device 102 in the vicinity of network-connected surface 126. In this example, a room may have two televisions on two different walls, or it may have a monitor connected to a computer and a television. The media guidance application may detect that the change in orientation of chair 108, which was initially facing a first display device (i.e., the monitor), is now facing display device 102. While chair 108 was facing the first display device, the media guidance application was displaying the recommendation of the content on the first display device.

In response to determining that the given object faced the different display device prior to the detected change in orientation, the media guidance application commands the different display device to cease generating for display the recommendation. For example, now that the media guidance application has determined that the orientation of chair 108 has moved away from the first display device to face display device 108, the media guidance application instructs the first display device to stop displaying the recommendation for the content.

Once a change in the positioning of each object on network-connected surface 126 is determined, the media guidance application may use the arrangement of furniture objects to determine media attributes associated with the environment created by the user. The arrangement of the furniture may be compared to a database that includes various templates of furniture arrangement. The media guidance application compares attributes of the second positioning of the plurality of physically inanimate objects to attributes of each template of a plurality of templates, where each template corresponds to a different possible positioning of the plurality of physically inanimate objects. For example, once the media guidance application has recorded the positioning of each piece of furniture placed on the network-connected surface 102 in layout 100(b) or layout 100(c), the media guidance application compares the layout of the furniture in the room to each entry in a database comprising a plurality of furniture layouts. Each furniture layout template may correspond to a particular scenario. The arrangement of the furniture on the network-connected surface may be compared with the templates to determine which template is closest to the furniture arrangement on network-connected surface 126.

Based on the comparison, the media guidance application may infer an environment being created by the user. The media guidance application determines, from the comparing, a first template from the plurality of templates to which the second positioning of the plurality of physically inanimate objects corresponds. For example, from the comparison between the layout of the furniture on the network-connected surface 102 in layout 100(b) and layout 100(c) to the various templates, the media guidance application may determine that furniture layout in layout 100(b) resembles a family evening with chairs 108 and 110 facing display device 102, and high chair 112 facing display device 102. In some embodiments, the plurality of templates may be specified by the user at the media guidance application. The user may program common scenarios that are created within the room with furniture placed on network-connected surface 102 on the media guidance application. In such cases, the media guidance application may compare the layout 100(b) and layout 100(c) to the layouts specified by the user.

Layout 100(c) is an exemplary layout for party. Dining table 106 has been removed and chairs 116-122 are arranged in a horseshoe manner around the coffee table 114. In some examples, the user may program layout 100(c) to be similar to a party layout. In some embodiments, the media guidance application may access a profile associated with the user to determine supplementary information relating to what sort of party the user may be hosting. For example, the media guidance application may access the user's calendar associated with the profile and determine that this may be a watch party for the Super Bowl, or the Academy Awards, or 'Game of Thrones'. In some embodiments, the media guidance application may also determine that it is a birthday party hosted by the user. In some examples, the user may program different layouts for each party that the user is expected to host in the media guidance application, which will help the media guidance application discern which template is being accessed. The change in layout may include bringing in new furniture (not shown) in layouts 100(b) or 100(c).

Based on the determined template layout of furniture, the media guidance application may determine media attributes associated with the layout. The media guidance application determines a set of media attributes corresponding to the first template by comparing the first template to entries of a database that each correspond a respective template of the plurality of templates to a respective set of media attributes. For example, in case the detected furniture layout resembles a Super Bowl party, the media guidance application may determine that the media attributes associated with the layout may be 'sports', 'NFL', 'football', and 'lombardi trophy.' In the example where the furniture layout resembles a birthday party, there may be no media attributes, to indicate that the user is not interested in any television program, or the attributes associated may be 'birthday', 'celebration', and 'party.'

Based on the determined media attributes, the media guidance application generates a content recommendation based on the first set of media attributes. For example, in the case the media attributes are 'sports', 'NFL', 'football', and 'lombardi trophy', the media guidance application may recommend the Super Bowl pregame show, the Super Bowl, the halftime show etc. In the case that the media attributes are birthday', 'celebration', and 'party', the media guidance application may recommend party music playlists and media assets related to birthday like '13 going on 30', 'Harry Potter', or 'Toy Story', for example. In case that there are no media attributes associated with a template, the media guidance application may not recommend any media assets. The media assets recommended also take into account user preferences recorded in the profile associated with the user. The user profile may include media assets that the user may regularly watch at a certain time that may be recommended by the media asset.

In some embodiments, the media guidance application detects whether a display device is present in a vicinity of the network-connected surface. For example, the media guidance application that is connected to the network-connected surface determines whether a display device is present in the same room as the network-connected surface. In some examples, the media guidance application may be connected to the network-connected surface and the display device over a network, like the Internet, for example. In response to detecting that the display device 102 is present in the vicinity of the network-connected surface 126, the media guidance application transmits a command to display device 102 to display the content recommendation on display device 102. So, in some examples, if the media guidance application determines the presence of a display device in the same room as the network-connected surface, the media guidance application may display the content recommendation of the Super Bowl to the user In some embodiments, the media guidance application detects a placement of an additional physically inanimate object on the network-connected surface. In some examples, the additional physically inanimate object may be another object of one of the types of objects already present on the network-connected surface. In layout 100(b), high chair 112 may be an example of an object that was not present in layout of furniture 100(a) but may be an additional object placed in layout of furniture 100(b). High chair 112 may be part of a user's child's furniture that the user may bring in and place it on network-connected surface 126 in layout 100(b). The presence of a new object (i.e., high chair 112) may now modify the layout 100(b).

The media guidance application compares attributes of the third positioning of the plurality of physically inanimate objects to attributes of each template of a plurality of templates, where each template corresponds to a different possible positioning of the new physically inanimate object. For example, the location of high chair 112 placed on network-connected surface 126 is added to the layout of the objects present on network-connected surface 126 in layout 100(b). The placement of high chair 112 may modify the layout of the furniture placed on network-connected surface 126 in layout 100(b). In such an example, the media guidance application now compares this modified template to the plurality of templates present in the database to determine, from the comparing, a second template from the plurality of templates to which the third positioning of the new physically inanimate object corresponds. Based on the positioning of high chair 112 on network-connected surface 126, the media guidance application may compare the updated furniture layout to the plurality of templates of furniture layouts.

The media guidance application may also keep track of the number of objects placed on the network-connected surface. In some embodiments, the media guidance application determines a first number of physically inanimate objects placed on the network-connected surface. For example, the media guidance application may determine a count of the number of objects placed on the network-connected surface. The media guidance application may further divide the count of the number of objects placed on the surface based on type of object. For example, the media guidance application may determine that there are 10 different objects placed on the network-connected surface. The media guidance application, based on a type associated with each physically inanimate object, may determine a second number of physically inanimate objects that may be used for sitting. For example, of the 10 objects placed on the network-connected surface, the media guidance application may determine that there is one dining table, 6 chairs, two sofas and a coffee table. Layout 100(c) depicts an increase in the number of chairs (116-122) in the room compared to layout 100(a) and layout 100(b).

The media guidance application may determine, from the number of objects of various types, a scenario that the user is creating on the network-connected surface and, based on the number of objects, may update the content recommendation. The media guidance application compares the second number of physically inanimate objects to a threshold, and based on the comparison, updates the first content recommendation to an updated content recommendation. For example, the media guidance application may determine that there are 16 chairs instead of 6 chairs placed on the network-connected surface. Based on the increase in the number of chairs above a particular threshold of 8 chairs, the media guidance application may determine that the user has scheduled a viewing party and may recommend content appropriate for viewing parties, like the Super Bowl, the Oscars, 'Game of Thrones', etc.

In some embodiments, the media guidance application determines an additional set of media attributes associated with the second template by comparing the second template to entries of a database that each correlate a respective template of the plurality of templates to a respective set of media attributes. For example, the media guidance application may use the updated template to determine additional media attributes that are associated with the updated template. In such examples, the media guidance application may determine that the number of chairs placed on the network-connected surface has increased from 6 to 16. Based on the increase in the number of chairs placed on the network-connected surface, the media guidance application updates the template layout of furniture that the layout of the furniture on the network-connected surface corresponds to. This updated template may be associated with a different set of media attributes in the database. For example, because the number of chairs placed on the network-connected surface has increased to indicate a viewing party, the media attributes associated with any furniture layout may include attributes, like 'NFL', 'football', 'Oscars', etc. Before the network-connected surface detected the presence of the high chair, the media guidance application may have determined that the media attributes of the previous template may be 'action', 'thriller', or 'romance'.

The media guidance application determines whether there is a conflict between the set of media attributes and the additional set of media attributes, and in response to determining that there is no conflict between the set of media attributes and the additional set of media attributes, the media guidance application updates the set of media attributes corresponding to the first template to include the additional set of media attributes corresponding to the second template, and updates the content recommendation to an updated content recommendation based on the updated media attributes. For example, the media guidance application may determine that the additional media attributes like 'NFL', 'football', 'Oscars', etc., do not conflict with the previous media attributes of 'action' and 'thriller' and therefore, the media guidance application may update the set of media attributes to include the additional media attributes of 'thriller' and 'action.' Based on this update. the media guidance application may recommend the Super Bowl to the user instead of the previous recommendation of a movie.

In some cases, the media attributes of the updated layout may not conflict with the media attributes of the previous layout. In some embodiments, in response to determining that there is a conflict between the set of media attributes and the additional set of media attributes, the media guidance application refrains from updating the content recommendation to the updated content recommendation. For example, the media guidance application may determine that the attributes indicated by the updated layout conflict with the attributes of the previous layout, namely, the attribute of 'NFL' conflicts with the attribute of 'romance' and based on the fact the media attributes conflict, the media guidance application may not update the content recommendation and may just ignore the update to the furniture layout.

In some embodiments, further in response to determining a conflict between the set of media attributes and the additional set of media attributes, the media guidance application generates a second content recommendation based on the additional set of media attributes on a secondary display device, for example, when the media guidance application determines that there is present in the room with the network-connected device a secondary device. Based on this determination, the media guidance application may generate the second content recommendation of the Super Bowl on the secondary device.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
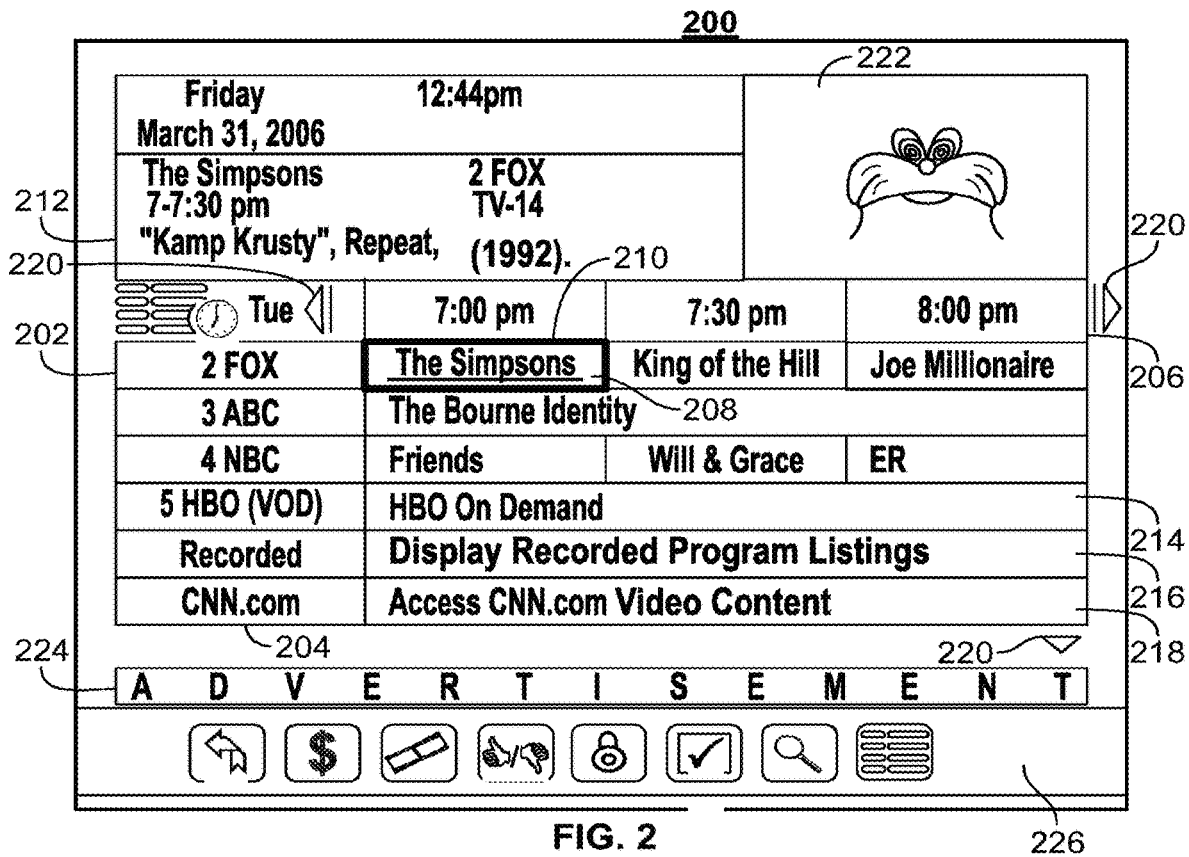
FIG. 2 shows an illustrative embodiment of a display screen that may be used to provide media guidance application listings and other media guidance information, in accordance with some embodiments of the disclosure.
Figure 3:
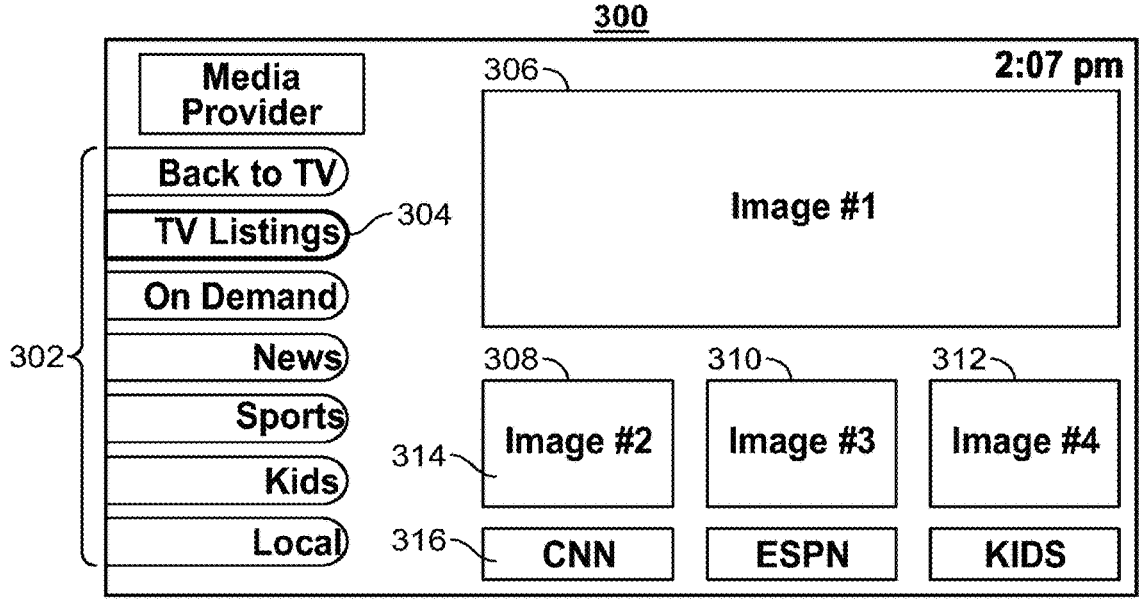
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
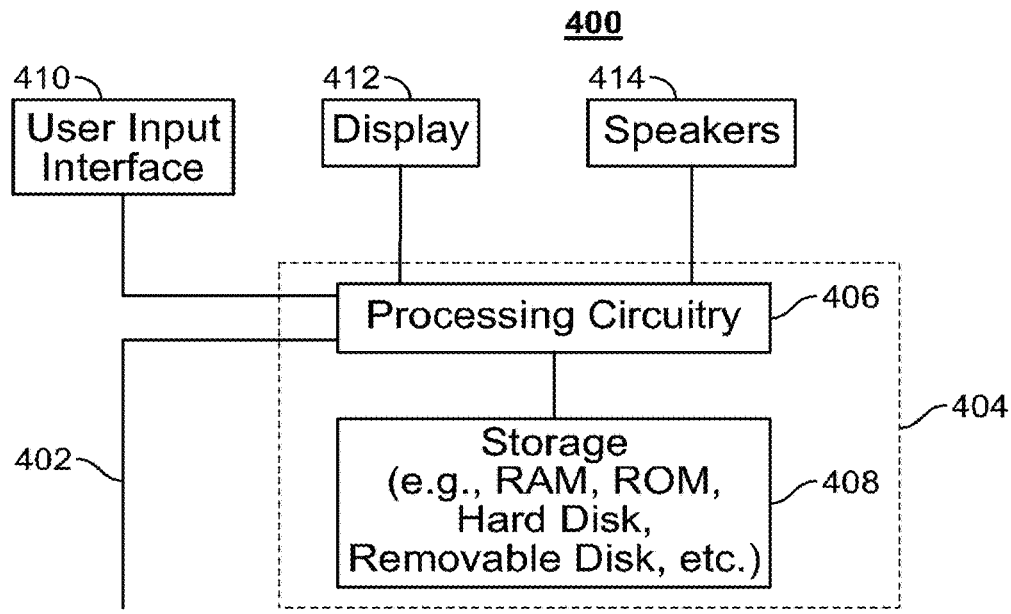
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
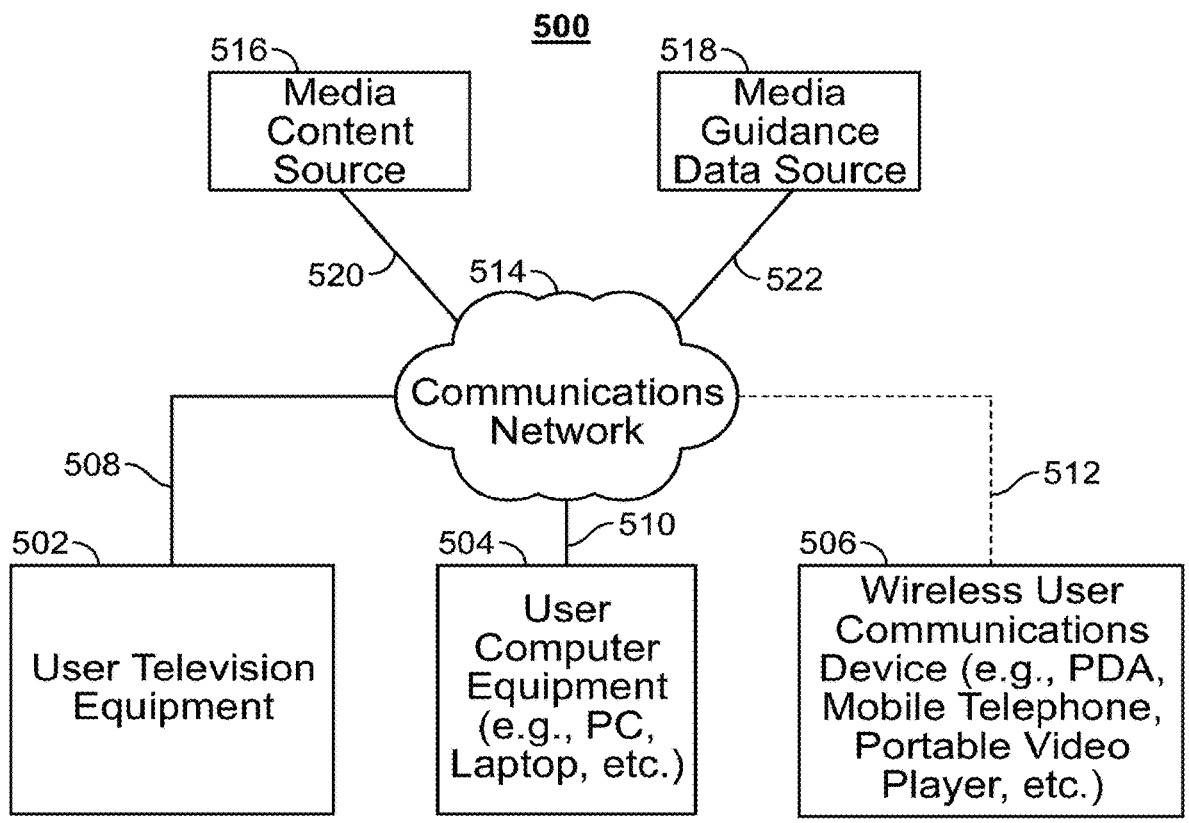
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on a communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 6 is a flowchart of a detailed illustrative process for prompting the second user to select between options to transmit the access rights or block the first device, in accordance with some embodiments of the disclosure. It should be noted that process 600 or any step thereof could be performed on, or provided by, any of the devices shown in FIGS. 5-6. For example, process 600 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 600 may be incorporated into or combined with one or more steps of any other process or embodiment (e.g., as described in relation to FIGS. 7-10). Many elements of process 600 have been described above with respect to FIG. 1, and those descriptions have full force and effect with respect to the below description of process 600, and thus details on previously described elements are omitted for the sake of brevity.

Process 600 begins at 602 where control circuitry 404 receives, from the network-connected surface, a plurality of object identifiers from media data source 514 for a plurality of physically inanimate objects of different types detected on the network-connected surface, where the object identifiers indicate a positioning of each object. At 604, control circuitry 404 determines, based on the object identifiers, a first arrangement of the plurality of physically inanimate objects. At 606, control circuitry 404 detects one or more changes in the plurality of object identifiers, where the one or more changes correspond to one or more changes in positioning from the first arrangement. At 608, control circuitry 404 determines a second arrangement of the plurality of physically inanimate objects. At 610, control circuitry 404 generates a content recommendation based on the second arrangement as an output on display 504.

Figure 7:
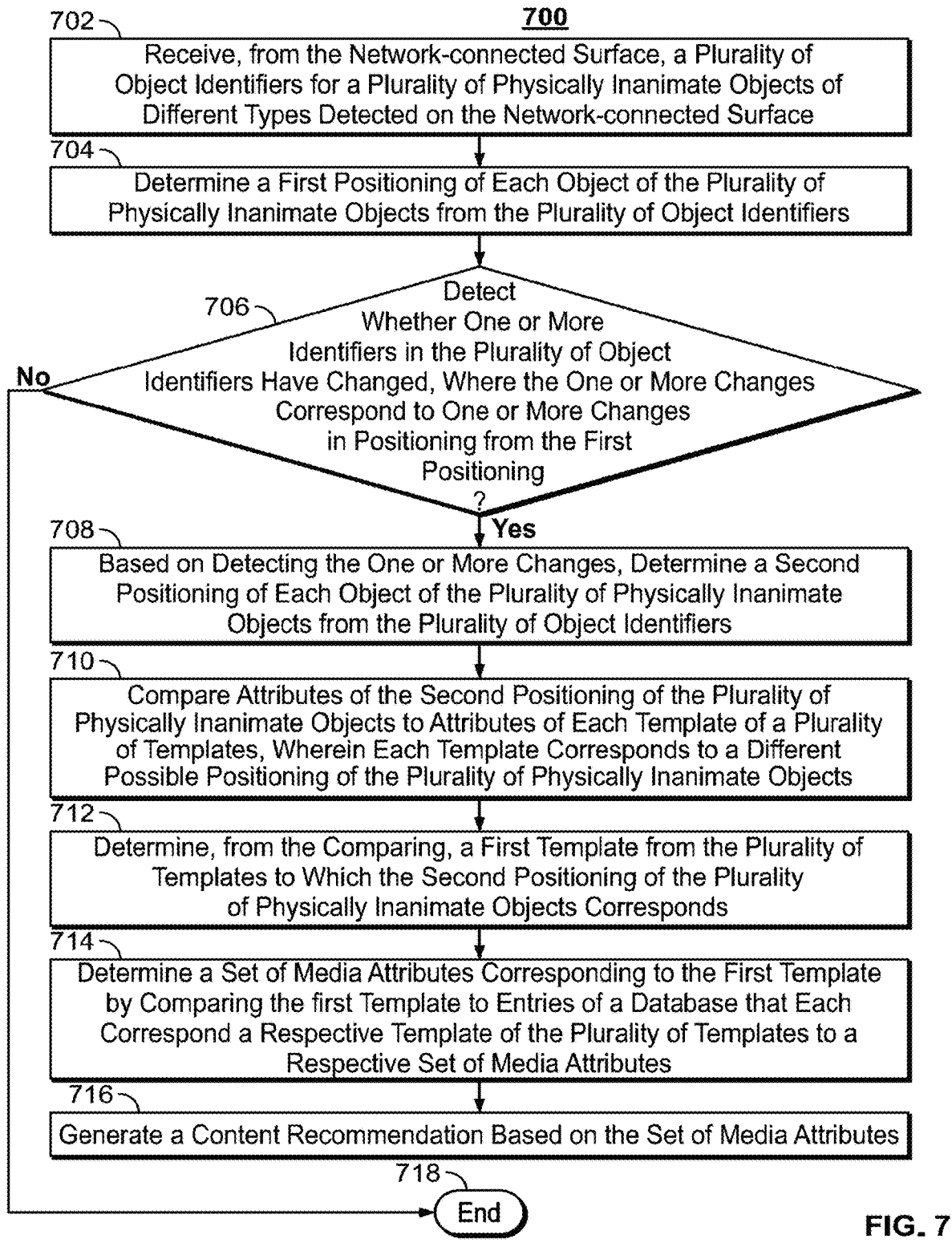
FIG. 7 depicts an illustrative flowchart of a process for providing media asset recommendations based on orientation of Internet-connected objects, in accordance with some embodiments of the disclosure.

FIG. 7 is a flowchart of a detailed illustrative process for prompting the second user to select between options to transmit the access rights or block the first device, in accordance with some embodiments of the disclosure. It should be noted that process 700 or any step thereof could be performed on, or provided by, any of the devices shown in FIGS. 4-5. For example, process 700 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 600 may be incorporated into or combined with one or more steps of any other process or embodiment (e.g., as described in relation to FIGS. 6 and 8-10). Many elements of process 700 have been described above with respect to FIG. 1, and those descriptions have full force and effect with respect to the below description of process 700, and thus details on previously described elements are omitted for the sake of brevity.

Process 700 begins at 702 where control circuitry 404 receives, from the network-connected surface, a plurality of object identifiers for a plurality of physically inanimate objects of different types detected on the network-connected surface. At 704, control circuitry 404 determines a first positioning of each object of the plurality of physically inanimate objects from the plurality of object identifiers. At decision block 706, control circuitry 404 detects whether one or more identifiers in the plurality of object identifiers have changed, where the one or more changes correspond to one or more changes in positioning from the first positioning. In response to detecting a change in the identifier of one or more identifiers in the plurality of object identifiers, process 700 moves to 708 where, based on detecting one or more changes, control circuitry 404 determines a second positioning of each object of the plurality of physically inanimate objects from the plurality of object identifiers. In response to detecting no change in the identifier of one or more identifiers in the plurality of object identifiers, process 700 moves to 718 to end. At 710, control circuitry 404 compares attributes of the second positioning of the plurality of physically inanimate objects in storage 408 to attributes of each template of a plurality of templates, where each template corresponds to a different possible positioning of the plurality of physically inanimate objects. At 712, control circuitry 404 determines, from the comparing, a first template from the plurality of templates to which the second positioning of the plurality of physically inanimate objects corresponds. At 714, control circuitry 404 determines a set of media attributes corresponding to the first template by comparing the first template to entries of a database that each correlates a respective template of the plurality of templates to a respective set of media attributes. At 716, control circuitry 404 generates a content recommendation based on the set of media attributes.

Figure 8:
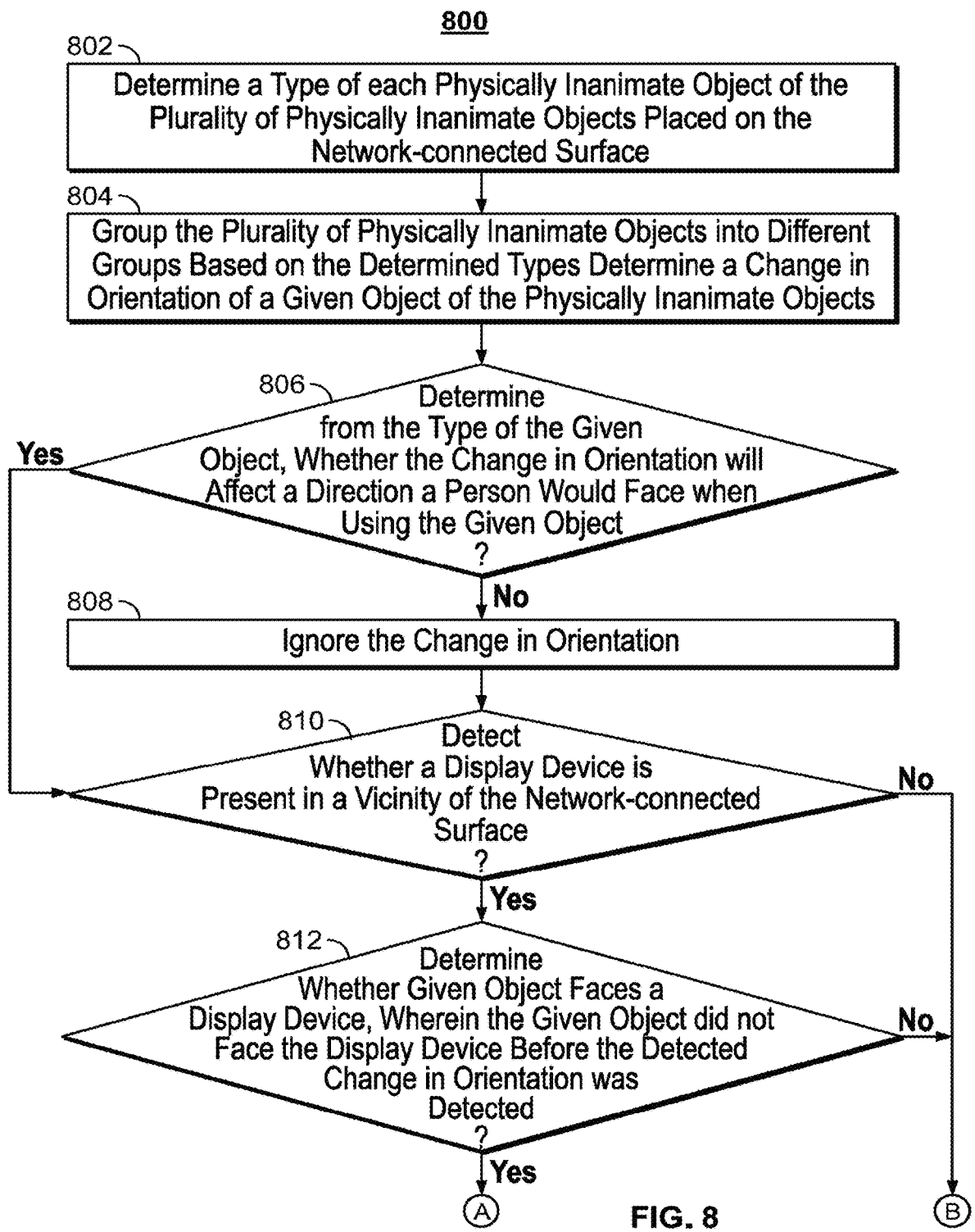
FIG. 8 depicts an illustrative flowchart of a process for quantifying an amount of an attribute present in a media asset, in accordance with some embodiments of the disclosure.
Figure 8:
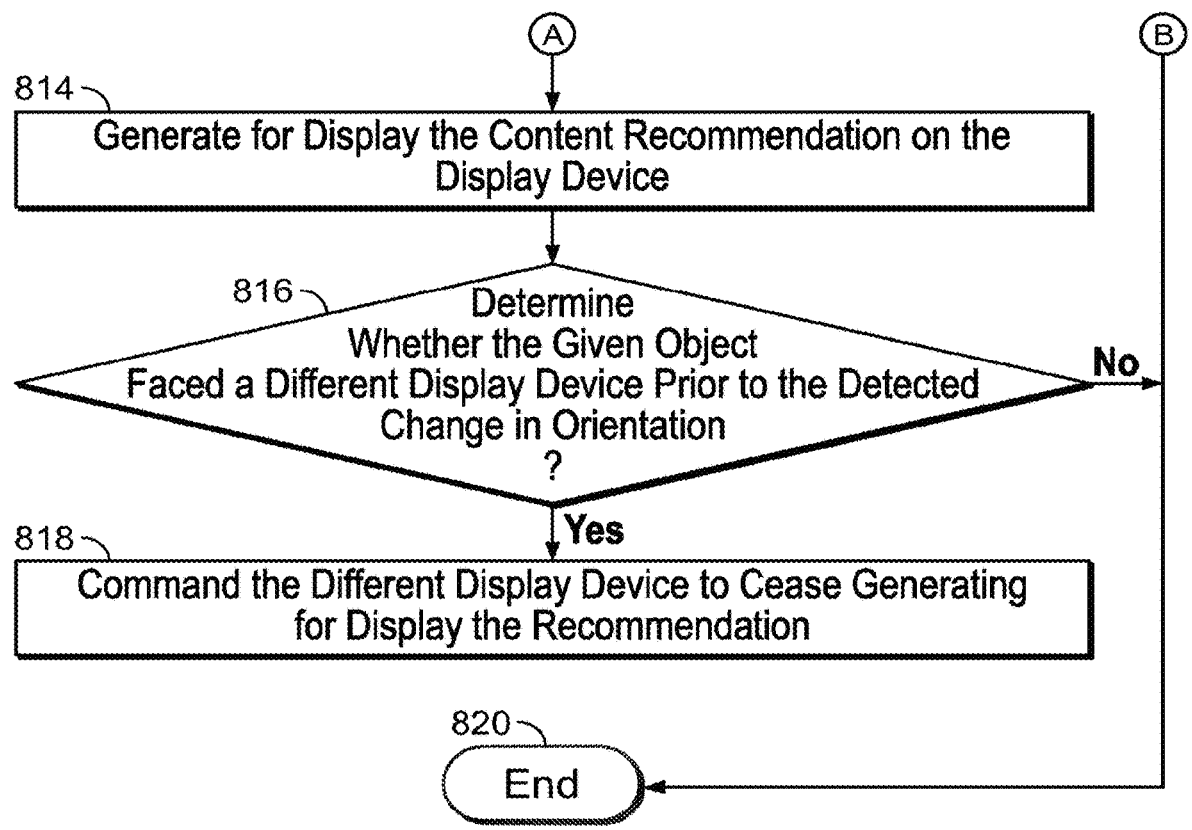

FIG. 8 is a flowchart of a detailed illustrative process for prompting the second user to select between options to transmit the access rights or block the first device, in accordance with some embodiments of the disclosure. It should be noted that process 800 or any step thereof could be performed on, or provided by, any of the devices shown in FIGS. 4-5. For example, process 800 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 800 may be incorporated into or combined with one or more steps of any other process or embodiment (e.g., as described in relation to FIGS. 6-7 and 9-10). Many elements of process 800 have been described above with respect to FIG. 1, and those descriptions have full force and effect with respect to the below description of process 800, and thus details on previously described elements are omitted for the sake of brevity.

Process 800 begins at 802 where control circuitry 404 determines a type of each physically inanimate object of the plurality of physically inanimate objects placed on the network-connected surface. At 804, control circuitry 404 groups the plurality of physically inanimate objects into different groups based on the determined types. At 806, control circuitry 404 determines a change in orientation of a given object of the physically inanimate objects. At decision block 806, control circuitry 404 determines from the type of the given object, whether the change in orientation will affect a direction a person would face when using the given object. In response to determining that the change in orientation will not affect a direction a person would face when using the given object, process 800 proceeds to 808 where control circuitry 404 ignores the change in orientation.

In response to determining that the change in orientation will affect a direction a person would face when using the given object, process 800 proceeds to 810 where control circuitry 404 detects whether a display device is present in the vicinity of the network-connected surface. In response to not detecting a display device in the vicinity of the network-connected surface, process 800 proceeds to 820 to end. In response to detecting a display device in the vicinity of the network-connected surface, process 800 proceeds to 812 where control circuitry 404 determines whether the given object faces a display device, where the given object did not face the display device before the detected change in orientation was detected. In response to determining that the given object faces the display device, process 800 proceeds to 814, where control circuitry generates for display the content recommendation on the display device. In response to determining that the given object does not face the display device, process 800 proceeds to 820 to end.

At 816, control circuitry 404 determines whether the given object faced a different display device prior to the detected change in orientation. In response to determining that the given object faced a different display device prior to the detected change in orientation, process 800 proceeds to 818 where control circuitry 404 commands the different display device to cease generating for display the recommendation. In response to determining that the given object did not face a different display device prior to the detected change in orientation, process 800 proceeds to 820 to end.

Figure 9:
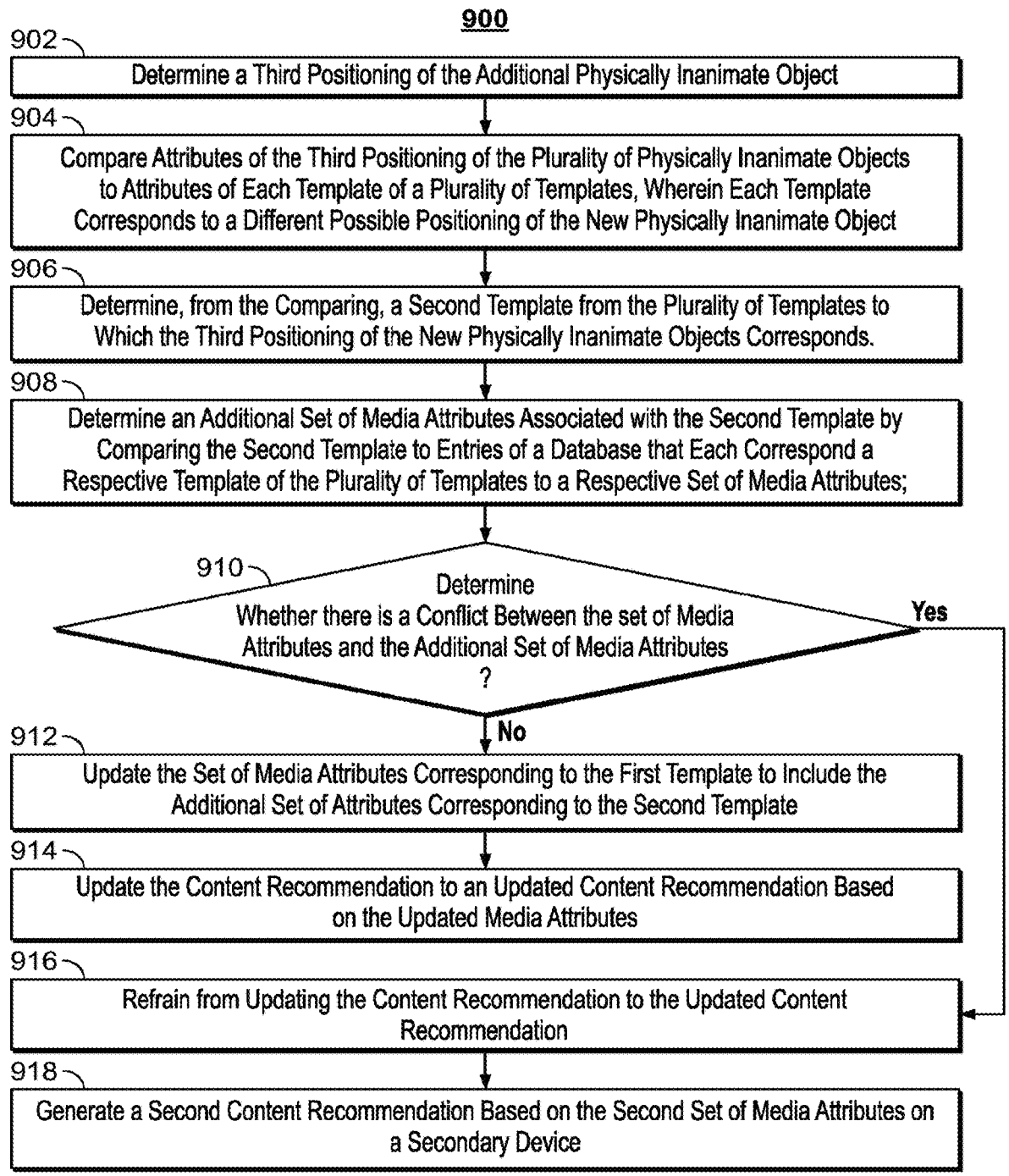
FIG. 9 depicts an illustrative flowchart of a process for determining that the media attribute does not match the user profile, in accordance with some embodiments of the disclosure.

FIG. 9 is a flowchart of a detailed illustrative process for prompting the second user to select between options to transmit the access rights or block the first device, in accordance with some embodiments of the disclosure. It should be noted that process 900 or any step thereof could be performed on, or provided by, any of the devices shown in FIGS. 4-5. For example, process 900 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 900 may be incorporated into or combined with one or more steps of any other process or embodiment (e.g., as described in relation to FIGS. 6-8 and 10). Many elements of process 900 have been described above with respect to FIG. 1, and those descriptions have full force and effect with respect to the below description of process 900, and thus details on previously described elements are omitted for the sake of brevity.

Process 900 begins at 902 where control circuitry 404 determines a third positioning of the additional physically inanimate object. At 904, control circuitry 404 compares attributes of the third positioning of the plurality of physically inanimate objects to attributes of each template of a plurality of templates, where each template corresponds to a different possible positioning of the new physically inanimate object. At 906, control circuitry 404 determines, from the comparing, a second template from the plurality of templates to which the third positioning of the new physically inanimate objects corresponds. At 908, control circuitry 404 determines an additional set of media attributes associated with the second template by comparing the second template to entries of a database that each correlate a respective template of the plurality of templates to a respective set of media attributes. At decision block 910, control circuitry 404 determines whether there is a conflict between the first set of media attributes and the second set of media attributes.

In response to determining that there is a conflict between the set of the media attributes and the additional set of media attributes, process 900 proceeds to 916 where control circuitry 404 refrains from updating the first content recommendation to the second content recommendation. At 918, control circuitry 404 generates the updated content recommendation based on the additional set of media attributes on a secondary device associated with the new type of physically inanimate object.

In response to determining that there is no conflict between the first set of media attributes and the second set of media attributes, process 900 proceeds to 912 where control circuitry 404 updates the set of media attributes corresponding to the first template to include the additional set of media attributes corresponding to the second template. At 914, control circuitry 404 updates the content recommendation to an updated content recommendation based on the updated media attributes.

Figure 10:
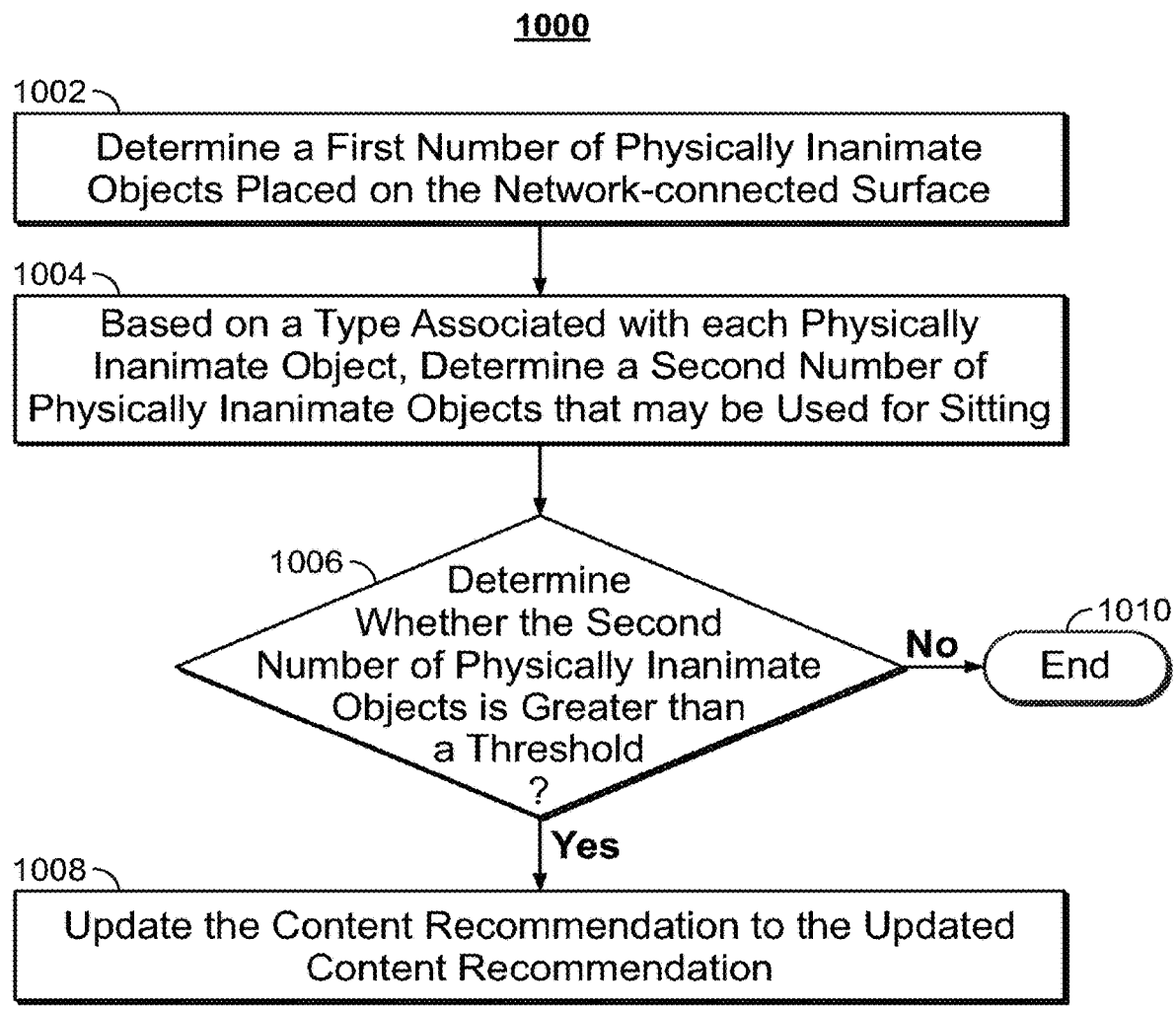
FIG. 10 depicts an illustrative flowchart of a process for reducing a size of the recommendation chain leading to a target media asset, in accordance with some embodiments of the disclosure.

FIG. 10 is a flowchart of a detailed illustrative process for prompting the second user to select between options to transmit the access rights or block the first device, in accordance with some embodiments of the disclosure. It should be noted that process 1000 or any step thereof could be performed on, or provided by, any of the devices shown in FIGS. 4-5. For example, process 1000 may be executed by control circuitry 404 (FIG. 4) as instructed by a media guidance application implemented on user equipment 102 (which may have the functionality of any or all of user equipment 502, 504, and/or 506 (FIG. 5)). In addition, one or more steps of process 1000 may be incorporated into or combined with one or more steps of any other process or embodiment (e.g., as described in relation to FIGS. 6-9). Many elements of process 1000 have been described above with respect to FIG. 1, and those descriptions have full force and effect with respect to the below description of process 1000, and thus details on previously described elements are omitted for the sake of brevity. Process 1000 starts at 1002 where control circuitry 404 determines a first number of physically inanimate objects placed on the network-connected surface. At 1004, based on a type associated with each physically inanimate object, control circuitry 404 determines a second number of physically inanimate objects that may be used for sitting. At decision block 1006, control circuitry 404 determines whether the second number of physically inanimate objects is greater than a threshold. In response to determining that the second number of physically inanimate objects is greater than the threshold, process 1000 proceeds to 1008 to update the first content recommendation to a second content recommendation. In response to determining that the second number of physically inanimate objects is less than the threshold, process 1000 proceeds to 1010 to end.

It should be noted that processes 600-1000 or any step thereof could be performed on, or provided by, any of the devices shows in FIGS. 1 and 4-5. For example, any of processes 600-1000 may be executed by control circuitry 404 (FIG. 5) as instructed by control circuitry implemented on user equipment 502, 504, 506 (FIG. 5), and/or a user equipment for selecting a recommendation. In addition, one or more steps of processes 600-1000 may be incorporated into or combined with one or more steps of any other process or embodiment.

It is contemplated that the steps or descriptions of each of FIGS. 6-10 may be used with any other embodiment of this disclosure. In addition, the steps and descriptions described in relation to FIGS. 6-10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-10.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
   receiving, from a network-connected surface, a first position associated with a group of inanimate objects that are located in a same confined space as a display device;
   receiving, from the network-connected surface, a change in position for the group of inanimate objects from the first position to a second position that is not the same as the first position; and
   in response to receiving the change in position:
      determining whether the changed position is associated with a first type of event; and
      in response to determining that the changed position is associated with the first type of event, recommending a media asset related to the first type of event for playing on the display device.

2. The method of claim 1, further comprising:
   determining that the changed position is associated with a second type of event; and
   determining whether a user located in the same confined space as the display device is interested in the second type of event.

3. The method of claim 2, further comprising, in response to determining that the user located in the same confined space as the display device is not interested in the second type of event, excluding media assets related to the second type of event from recommendation.

4. The method of claim 2, further comprising, determining the user's interest in the second type of event based on information in the user's profile.

5. The method of claim 2, further comprising:
   accessing a calendar associated with the user;
   determining whether the calendar includes data related to the second type of event; and
   recommending a media asset associated with the second type of event based in response to determining that the calendar includes data related to the second type of event.

6. The method of claim 5, wherein the data related to the second type of event in the calendar is a date or time of a party related to the second type of event.

7. The method of claim 1, wherein determining whether the changed position is associated with the first type of event comprises:
   determining a layout of the group of inanimate objects in the changed position;
   comparing the layout to one or more templates; and
   determining that the layout is associated with the first type of event based on a match with a template, from the one or more templates.

8. The method of claim 7, wherein the template that matches the layout of the group of inanimate objects in the changed position is a template associated with the first type of event.

9. The method of claim 1, further comprising:
   determining a number of physically inanimate objects, from the group of inanimate objects, placed on the network-connected surface that are used for sitting; and
   comparing the number of physically inanimate objects that are used for sitting to a threshold.

10. The method of claim 9, further comprising:
   in response to determining that the number of physically inanimate objects is greater than the threshold, updating the content recommendation.

11. A system comprising:
control circuitry configured to:
  receive, from a network-connected surface, a first position associated with a group of inanimate objects that are located in a same confined space as a display device;
  receive, from the network-connected surface, a change in position for the group of inanimate objects from the first position to a second position that is not the same as the first position; and
  in response to receiving the change in position:
    determine whether the changed position is associated with a first type of event; and
    in response to determining that the changed position is associated with the first type of event, recommend a media asset related to the first type of event for playing on the display device.

12. The system of claim 11, further comprising, the control circuitry configured to:
  determining that the changed position is associated with a second type of event; and
  determining whether a user located in the same confined space as the display device is interested in the second type of event.

13. The system of claim 12, further comprising, in response to determining that the user located in the same confined space as the display device is not interested in the second type of event, the control circuitry configured to exclude media assets related to the second type of event from recommendation.

14. The system of claim 12, further comprising, the control circuitry configured to determine the user's interest in the second type of event based on information in the user's profile.

15. The system of claim 12, further comprising, the control circuitry configured to:
  access a calendar associated with the user;
  determine whether the calendar includes data related to the second type of event; and
  recommend a media asset associated with the second type of event based in response to determining that the calendar includes data related to the second type of event.

16. The system of claim 15, wherein the data related to the second type of event in the calendar is a date or time of a party related to the second type of event.

17. The system of claim 11, wherein determining whether the changed position is associated with the first type of event comprises, the control circuitry configured to:
  determine a layout of the group of inanimate objects in the changed position;
  compare the layout to one or more templates; and
  determine that the layout is associated with the first type of event based on a match with a template, from the one or more templates.

18. The system of claim 17, wherein the template that matches the layout of the group of inanimate objects in the changed position is a template associated with the first type of event.

19. The system of claim 11, further comprising, the control circuitry configured to:
  determine a number of physically inanimate objects, from the group of inanimate objects, placed on the network-connected surface that are used for sitting; and
  compare the number of physically inanimate objects that are used for sitting to a threshold.

20. The system of claim 19, further comprising, the control circuitry configured to:
  in response to determining that the number of physically inanimate objects is greater than the threshold, update the content recommendation.

* * * * *